Nov. 24, 1964 G. E. HANSEN ETAL 3,158,377
FABRICATED STUFFING BOX WITH GLAND EYE-BOLT ARRANGEMENT
Filed July 23, 1963
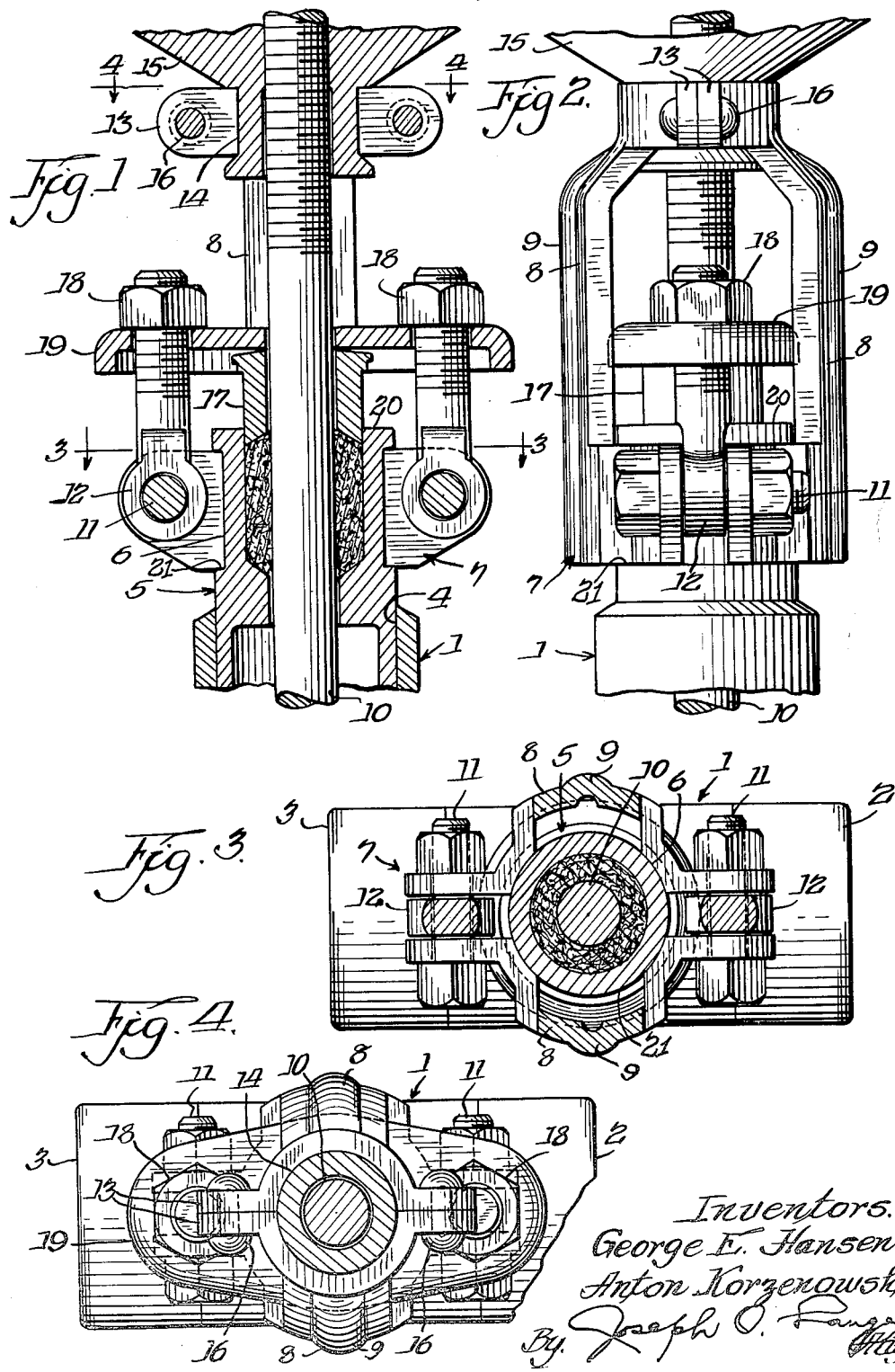
Inventors.
George E. Hansen,
Anton Korzenowski,
By Joseph O. Lange
Atty.

United States Patent Office 3,158,377
Patented Nov. 24, 1964

3,158,377
FABRICATED STUFFING BOX WITH GLAND
EYE-BOLT ARRANGEMENT
George E. Hansen, Elmwood Park, and Anton Korzenowski, Brookfield, Ill., assignors to Crane Co., Chicago, Ill., a corporation of Illinois
Filed July 23, 1963, Ser. No. 297,085
4 Claims. (Cl. 277—105)

This invention relates generally to a split clamp construction for gland bolts and stuffing boxes for valves, pumps, or like pressure vessels, in which a reciprocating or rotating or a combined reciprocating and rotating stem or shaft is employed for actuation in a fluid tight mounting or bearing.

At the outset, in order to obtain a clearer appreciation of the scope of invention hereinafter described, it should be understood that in the course of compressing the packing in the stuffing box, frequently, the latter is tightened by means of threaded gland nuts or a gland flange employing stud bolts or eye bolts to compress said packing. The objection to such prior designs, particularly where threaded gland nuts are employed, lies in the expense in maintenance of such stuffing box means, and further, the requirement of excessively high torque in tightening said gland nuts and thus necessitating the use of large and cumbersome wrenches. The latter tools are obviously difficult to handle because the space between the yoke arms is necessarily restricted considering the compactness encountered in most valve designs.

A further objection to the prior use of the more easily retained eye bolt designs lies in the fact that the ears for the eye bolts usually positioned on the bonnet or on the yoke are not easy to cast conveniently and furthermore the drilling for eye bolt pins for the gland bolts frequently has necessitated an extra machining operation thereby to increase the cost of drilling fixtures.

A further objection to the prior art constructions also resides in the fact that the conventional eye bolt and designs previously employed did not usually permit of mounting the gland bolts sufficiently close to the valve central axis to reduce the bending moment on the gland flange substantially as well as aiding to maintain such flange dimensions to desirable proportions.

A further objection to prior uses resides in the fact that the eye bolt pins employed frequently have loosened and the gland eye bolts have then been lost or else have slipped into inaccessible areas when packing the stuffing box.

Therefore, it is an important object of this invention to provide a gland and stuffing box construction in which the eye bolts employed therefor are securely positioned to prevent loss of eye-bolts at any time and yet permitting the gland eye-bolts to readily swing outwardly when it is desired for re-packing of the stuffing box and also providing ease of assembly and disassembly of the gland bolts.

A further object is to provide for a gland eye-bolt mounting in which the eye bolt is safely mounted upon the same retaining means as are used for tightening a fixedly anchored split clamp in holding the latter member upon bonnet or stuffing box.

In providing for desirable compactness in the arrangement for the positioning of the gland eye bolts, an object is to provide for a valve yoke construction or the like, the lower clamp-like part which is securely positioned within a neck or recessed portion of a wall of the stuffing box and bonnet to effect said compactness.

Another object is to provide for a gland eye bolt construction in which the eye bolts are mounted on the same axis as the bolts for the clamp whereby to draw the split clamps simultaneously together in mounting the combined yoke over the stuffing box and bonnet.

A further object is to provide for a gland eye bolt construction in which the eye bolts can only be removed upon disassembly of the split clamp bolts. The yoke arm bolts serve as the basis of pivotal movement for the gland eye bolts.

A further important object is to provide for a combined split clamp and yoke construction for the mounting of the gland bolts in which the arms of the yoke are integral with the clamp halves and thus cooperate with the gland bolt retainer to limit the longitudinal movement of the clamp halves when compression is applied by the gland bolts to compress the packing. As will hereinafter become apparent, the eye bolts in this construction are held to the engaging clamp halves by the same means employed to draw said clamp halves tightly over the combined stuffing box and bonnet between flanged and reduced neck portions thereof.

A further important object of this invention is to provide for a split yoke construction which may be fabricated from sheet metal or forged as distinguished from being cast. In the instant invention, the yoke engages the combined bonnet and stuffing box by means of split clamp members carrying preferably integral therewith the yoke arms which serve to support the valve actuating means.

A further important object is to provide for a stuffing box and gland construction in which arcuate surfaces of the yoke arms cooperate with the combined stuffing box and bonnet so as to allow for a contact therebetween permitting the yoke and the gland bolts to be predeterminately rotatable as a unit between said yoke arms.

Other objects and advantages will become more readily apparent upon proceeding with the specification read in light of the accompanying drawings, in which:

FIG. 1 is a fragmentary sectional assembly of a valve embodying our invention;

FIG. 2 is an exterior fragmentary view taken at right angles to the view shown in FIG. 1;

FIG. 3 is a transverse sectional view taken on the line 3—3 of FIG. 1; and

FIG. 4 is a transverse sectional view taken on the line 4—4 of FIG. 1.

Similar reference numerals refer to similar parts throughout the several views.

Referring now to FIG. 1, an upper bonnet portion of a valve body or casing fragmentarily shown and generally designated 1 is illustrated having the usual end connections 2 and 3 for attachment to a pipe line (not shown) and shown more clearly in FIG. 3.

The said casing portion is recessed as at 4 to receive the integral stuffing box-bonnet member generally designated 5 and which is preferably attached to said casing by any suitable soldering, welding, or brazing to secure said stuffing box member fixedly within the said casing. On an outer periphery of the stuffing box as at surface 6 lying between the integral flange 20 and the annular shoulder 21 thereon, a yoke member generally designated 7 is closely mounted. The said yoke member consists of a pair of oppositely disposed end-connected clamp members, each of said clamp members having thereon the yoke arms 8. As shown, the arm portions 8 preferably suitably formed with the grooved central portion 9 for stiffening and strengthening the arms.

The gland eye-bolts 12 are pivotally supported within said combined clamp members and yoke arms 8 on the transversely extending bolts 11 carried by said clamps.

The said combined yoke and arm clamp members at their lower portions are held together around the peripheral portion 6 by means of said bolts 11. At their upper end limits, the said yoke arms integral extensions are provided on each clamp section as at 13 curve inwardly and are slipped over the depending shank portion 14 of the handwheel 15, or similar retaining actuating means for the valve stem 10. They are then held in suitable clamped position by means of the transversely extending rivets 16 or other suitable retaining means.

A reciprocally movable valve stem 10 extends through the entire assembly above described for purpose of actuating a closure member (not shown). A gland member 17 and gland flange 19 cooperates with the nuts 18 directly to compress the packing in the stuffing box or to allow for renewal thereof as required.

It will now be clear in this construction that the combined yoke arms clamp members and the gland bolt retainer may be fabricated from a lightweight metal or sheet material, or made of tubular members suitably formed to allow for employing the split or spaced-apart arm construction described as at 8 making it unnecessary to resort to the more expensive use of patterns and castings.

It will be understood that the gland nuts 18 upon their removal from the gland flange 19 will enable the pivotally mounted gland eye bolts 12 thereby to be swung outwardly about the bolts without loss.

While only a single embodiment has been shown and described, it will be appreciated that this is for purposes of description and not of limitation. The scope of the invention should therefore be measured by the scope of the appended claims.

We claim:
1. In a valve construction or the like for supporting an actuating mechanism with a shouldered annular portion, the combination including an integral stuffing box-bonnet member and a separable yoke assembly, the yoke having a pair of integral spaced-apart arms, pivotally mounted gland bolts of eye-bolt configuration for the stuffing box, retainer means for the said gland bolts, the said retainer means including said yoke comprising a pair of superposed spaced-apart clamp members at each end of said yoke arms respectively for engagement with said integral stuffing box bonnet member and said actuating mechanism, means cooperating with the gland bolts for drawing said yoke clamp members together, the lower one of said superposed clamp members providing for said pivotal mounting of said gland bolts, the said yoke clamp members having inner arcuate surface portions closely engaging said spaced-apart annular shoulder portions of said stuffing box member and said shouldered portions on said actuating mechanism whereby to fixedly retain said clamp members at opposite ends of said yoke arms against longitudinal and rotational movements upon assembly of said clamp members with the stuffing box-bonnet member and said actuating mechanism.

2. The subject matter of claim 1, each of the said clamp portions of said yoke arm members being of a height and diameter permitting their reception snugly between said shoulder portions of the said stuffing box and said actuating mechanism upon being drawn together.

3. The subject matter of claim 1, the diameter of said stuffing box portion between said stuffing box annular shoulder portions establishing the transverse spacing of said spaced apart clamp members of the said yoke arms.

4. The subject matter of claim 3, the upper one of said stuffing box annular shoulder portions substantially defining the upper limit of said stuffing box member.

References Cited in the file of this patent
UNITED STATES PATENTS

| | | |
|---|---|---|
| 2,416,917 | Gleason | Mar. 4, 1947 |
| 2,555,262 | Weinberg | Mar. 29, 1951 |
| 2,563,012 | Depp et al. | Aug. 7, 1951 |

FOREIGN PATENTS

| | | |
|---|---|---|
| 574,752 | Canada | Apr. 29, 1959 |